(12) United States Patent
Kikkawa

(10) Patent No.: US 11,232,908 B2
(45) Date of Patent: Jan. 25, 2022

(54) CAPACITOR HAVING IMPROVED POSITIONAL RELATIONSHIP BETWEEN TERMINAL MOUNT AND CASE

(71) Applicant: Panasonic Intellectual Property Management Co., Ltd., Osaka (JP)

(72) Inventor: Hiroyuki Kikkawa, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 6 days.

(21) Appl. No.: 16/726,866

(22) Filed: Dec. 25, 2019

(65) Prior Publication Data

US 2020/0135399 A1    Apr. 30, 2020

Related U.S. Application Data

(63) Continuation of application No. PCT/JP2018/026689, filed on Jul. 17, 2018.

(30) Foreign Application Priority Data

Aug. 2, 2017 (JP) .............................. JP2017-149808

(51) Int. Cl.
*H01G 4/224* (2006.01)
*H01G 4/228* (2006.01)
(Continued)

(52) U.S. Cl.
CPC ............... *H01G 4/224* (2013.01); *H01G 2/02* (2013.01); *H01G 2/10* (2013.01); *H01G 4/228* (2013.01); *H01G 4/32* (2013.01); *H01G 9/08* (2013.01)

(58) Field of Classification Search
CPC ........... H01G 4/228; H01G 2/02; H01G 4/224
See application file for complete search history.

(56) References Cited

U.S. PATENT DOCUMENTS 5,642,255 A * 6/1997 Suzuki ................... H01G 2/103
361/517
2004/0161975 A1    8/2004 Sakai et al.

FOREIGN PATENT DOCUMENTS

JP    54118634 U  *  8/1979
JP    2000323355 A *  11/2000
(Continued)

OTHER PUBLICATIONS

International Search Report of PCT application No. PCT/JP2018/026689 dated Oct. 16, 2018.

*Primary Examiner* — David M Sinclair
(74) *Attorney, Agent, or Firm* — McDermott Will & Emery LLP

(57) ABSTRACT

A capacitor includes a capacitor element, a bus bar, a case, and a terminal mount. The bus bar includes an electrode terminal connected to an electrode of the capacitor element and a connection terminal configured to be connected to an external terminal. The case houses the capacitor element connected to the bus bar. The terminal mount is disposed closer to an opening of the case than the capacitor element is. The terminal mount is configured to allow the external terminal and the connection terminal to be fixed to the terminal mount. The terminal mount includes a positioning part that positions the terminal mount with respect to the case in a first direction, which is parallel to an opening face of the opening.

5 Claims, 8 Drawing Sheets

(51) Int. Cl.
*H01G 2/02* (2006.01)
*H01G 2/10* (2006.01)
*H01G 4/32* (2006.01)
*H01G 9/08* (2006.01)

(56) References Cited

FOREIGN PATENT DOCUMENTS

| | | | | | |
|---|---|---|---|---|---|
| JP | 2002324727 | A | * | 11/2002 | ............... H01G 4/33 |
| JP | 2006332493 | A | * | 12/2006 | ............... H01G 4/38 |
| JP | 2007081007 | A | * | 3/2007 | ............... H01G 4/18 |
| JP | 2009-043730 | | | 2/2009 | |
| JP | 2012-044097 | | | 3/2012 | |
| JP | 2012151378 | A | * | 8/2012 | |
| JP | 2013-219110 | | | 10/2013 | |
| JP | 2014086628 | A | * | 5/2014 | |
| JP | 2016152243 | A | * | 8/2016 | |
| WO | WO-2016027462 | A1 | * | 2/2016 | ............... H01G 4/33 |

* cited by examiner

CAPACITOR HAVING IMPROVED POSITIONAL RELATIONSHIP BETWEEN TERMINAL MOUNT AND CASE

RELATED APPLICATIONS

This application is a continuation of the PCT International Application No. PCT/JP2018/026689 filed on Jul. 17, 2018, which claims the benefit of foreign priority of Japanese patent application No. 2017-149808 filed on Aug. 2, 2017, the contents all of which are incorporated herein by reference.

BACKGROUND

1. Technical Field

The present disclosure relates to a capacitor.

2. Description of the Related Art

Unexamined Japanese Patent Publication No. 2013-219110 discloses a capacitor that includes a capacitor element, a case housing the capacitor element, and a terminal mount. Electrodes of the capacitor element at both ends thereof are connected to bus bars, respectively. The case of the capacitor is filled with a resin.

In the capacitor of Unexamined Japanese Patent Publication No. 2013-219110, the bus bars each include an external connection terminal having an attachment hole through which the capacitor is attached to an external device. One side of the terminal mount is embedded in the resin and the other side of the terminal mount has a thread part while the terminal mount is not in contact with the case. The thread part of the terminal mount is placed face-to-face with the attachment hole of the external connection terminal. When a screw passing through the attachment hole is put into the thread part to connect the capacitor to the external device, the external connection terminal and the terminal mount are fixed together with the screw.

SUMMARY

A capacitor according to a main aspect of the present disclosure includes a capacitor element, a bus bar, a case, and a terminal mount. The capacitor element includes an electrode. The bus bar includes an electrode terminal connected to the electrode of the capacitor element and a connection terminal configured to be connected to an external terminal. The case has an opening and houses the capacitor element connected to the bus bar. The terminal mount is disposed closer to the opening of the case than the capacitor element is. The terminal mount is configured to allow the external terminal and the connection terminal to be fixed to the terminal mount. The terminal mount includes a positioning part that positions the terminal mount with respect to the case in a first direction, which is parallel to an opening face of the opening.

The present disclosure provides the capacitor in which accuracy of a positional relationship between the terminal mount and the case can be improved.

Effects or meanings of the present disclosure will be further clarified in the following description of an exemplary embodiment. However, the exemplary embodiment shown below is merely one example of implementing the present disclosure, and the present disclosure is not at all limited to the examples described in the following exemplary embodiment.

DETAILED DESCRIPTION OF EMBODIMENT

Figure 1A:
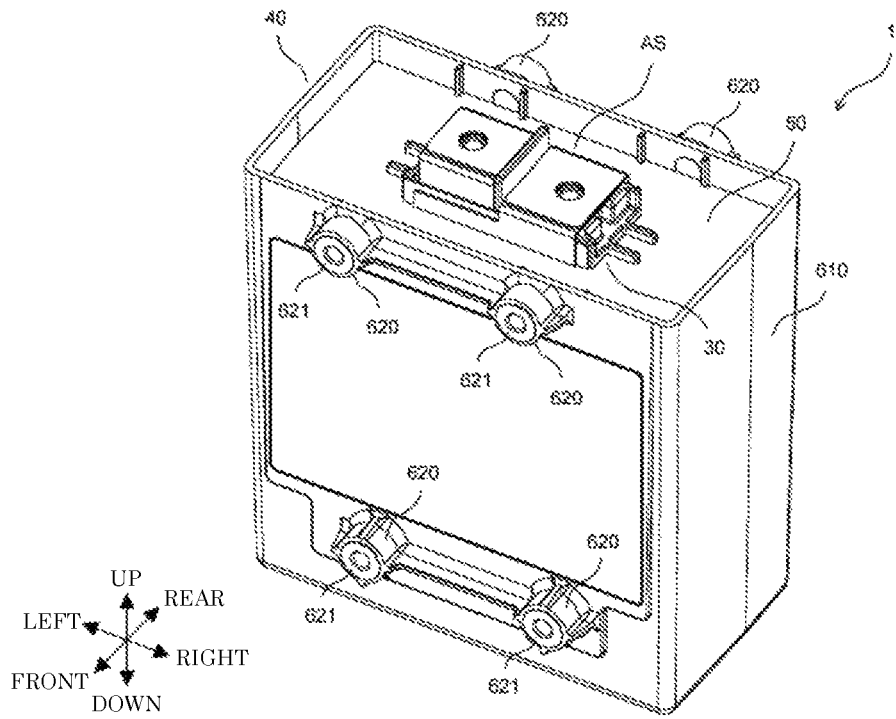
FIG. 1A is a perspective view illustrating a film capacitor according to an exemplary embodiment.

In the capacitor of Unexamined Japanese Patent Publication No. 2013-219110, the terminal mount is not in contact with the case and thus the terminal mount is not positioned with respect to the case. This configuration does not improve accuracy of a positional relationship between the terminal mount and the case.

In view of the above problem, the present disclosure provides a capacitor in which accuracy of a positional relationship between a terminal mount and a case can be improved.

With reference to the accompanying drawings, film capacitor 1, which is an exemplary embodiment of a capacitor of the present disclosure, will be described below. For the sake of convenience, directions including front and rear, right and left, and up and down are added to the drawings as appropriate. These directions are not absolute directions but relative directions in relation to an orientation of film capacitor 1.

In the exemplary embodiment, film capacitor 1 corresponds to "a capacitor" described in the appended claims. First end-face electrode 111 and second end-face electrode 112 each correspond to an "electrode" described in the appended claims First front bus bar 200A and first rear bus bar 200B each correspond to a "first bus bar" and a "bus bar" described in the appended claims Second front bus bar 300A and second rear bus bar 300B each correspond to a "second bus bar" and a "bus bar" described in the appended claims First connection terminal 240 and second connection terminal 340 each correspond to a "connection terminal" described in the appended claims Leg 521 corresponds to a "beam shaped part" described in the appended claims.

In the present exemplary embodiment, a front-rear direction corresponds to a "first direction" described in the appended claims, a right-left direction corresponds to a "second direction" described in the appended claims, and an up-down direction corresponds to a "third direction" described in the appended claims.

However, the above description is only intended to define correspondences between components in the claims and components in the exemplary embodiment. The correspondences described above do not limit the scope of the disclosure in the claims to the configuration described in the exemplary embodiment.

Figure 1B:
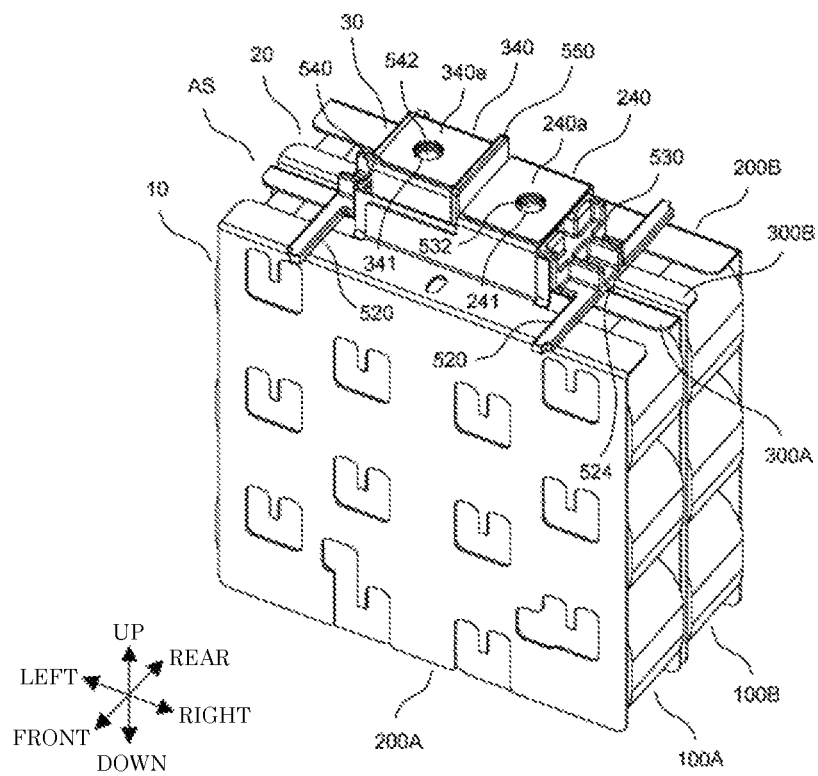
FIG. 1B is a perspective view illustrating a capacitor assembly made up of a front capacitor element unit, a rear capacitor element unit, and a terminal mount according to the exemplary embodiment.
Figure 2:
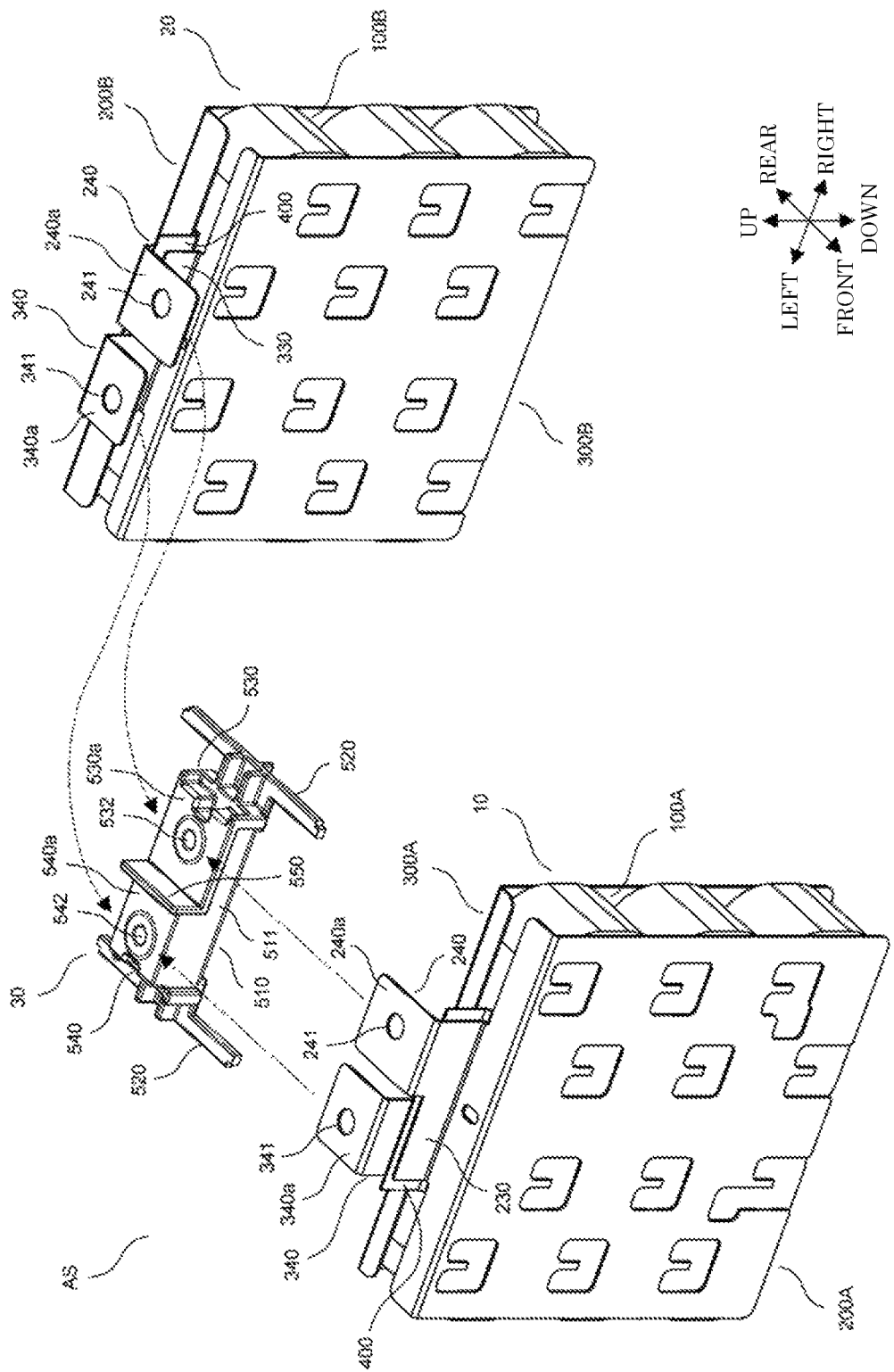
FIG. 2 is an exploded perspective view illustrating the capacitor assembly according to the exemplary embodiment.
Figure 3:
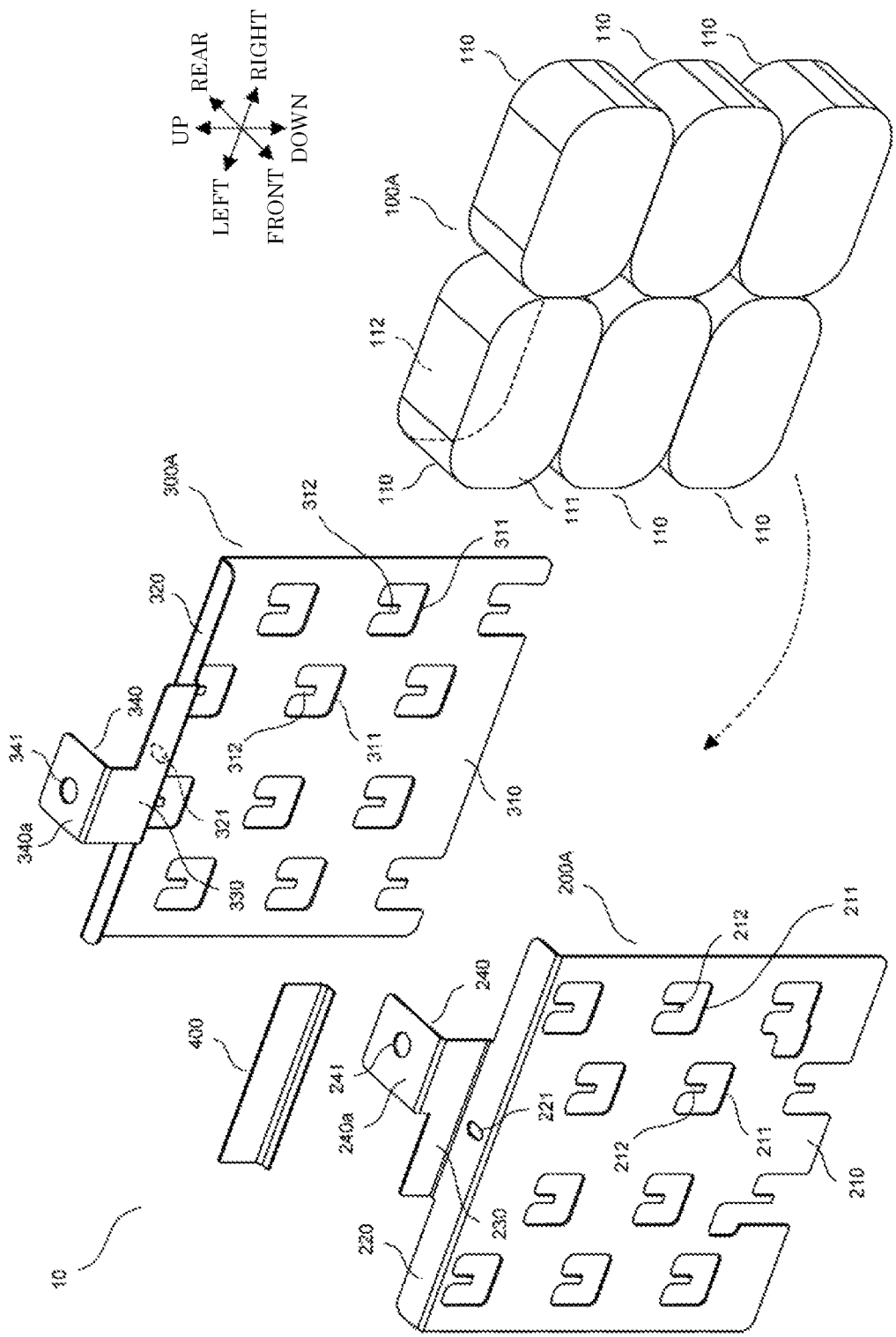
FIG. 3 is an exploded perspective view illustrating the front capacitor element unit according to the exemplary embodiment.
Figure 4:
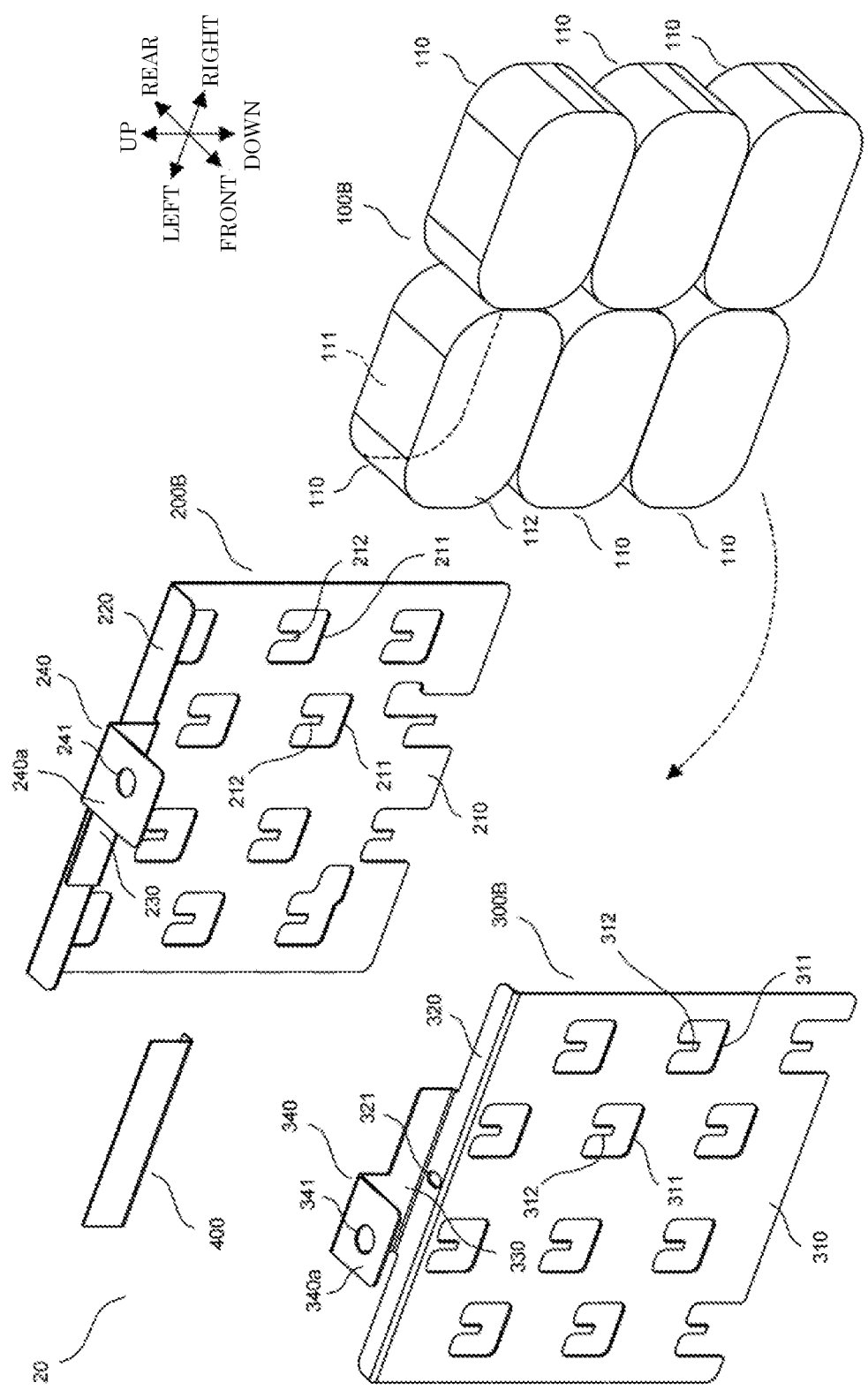
FIG. 4 is an exploded perspective view illustrating the rear capacitor element unit according to the exemplary embodiment.
Figure 5A:
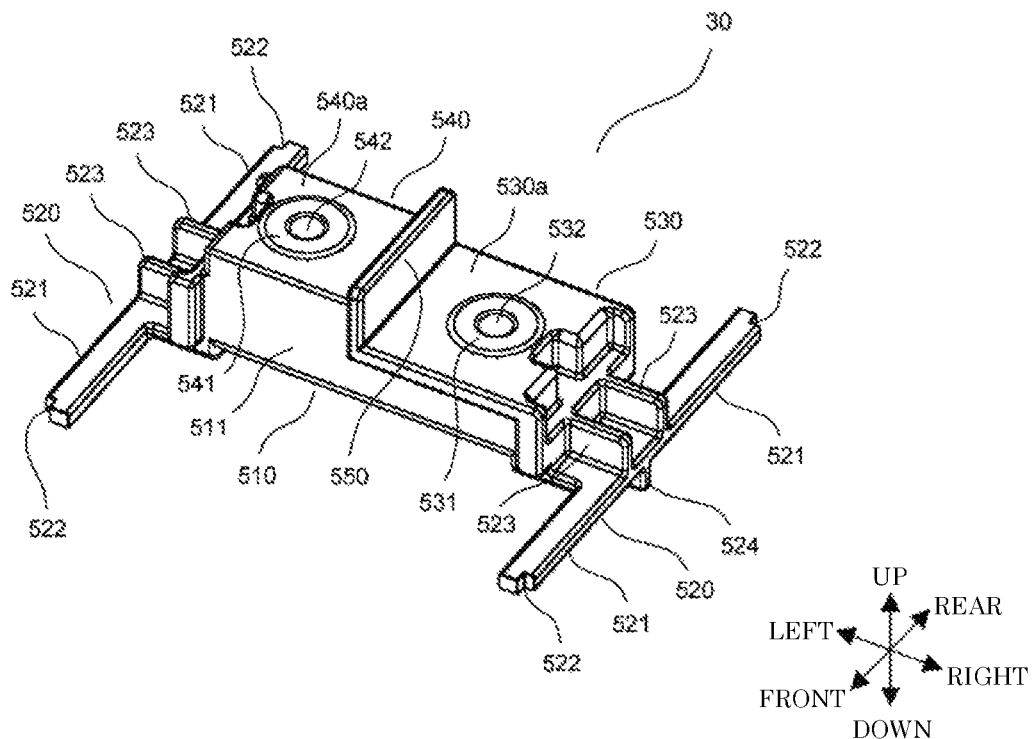
FIG. 5A is an upper front perspective view illustrating the terminal mount according to the exemplary embodiment.
Figure 5B:
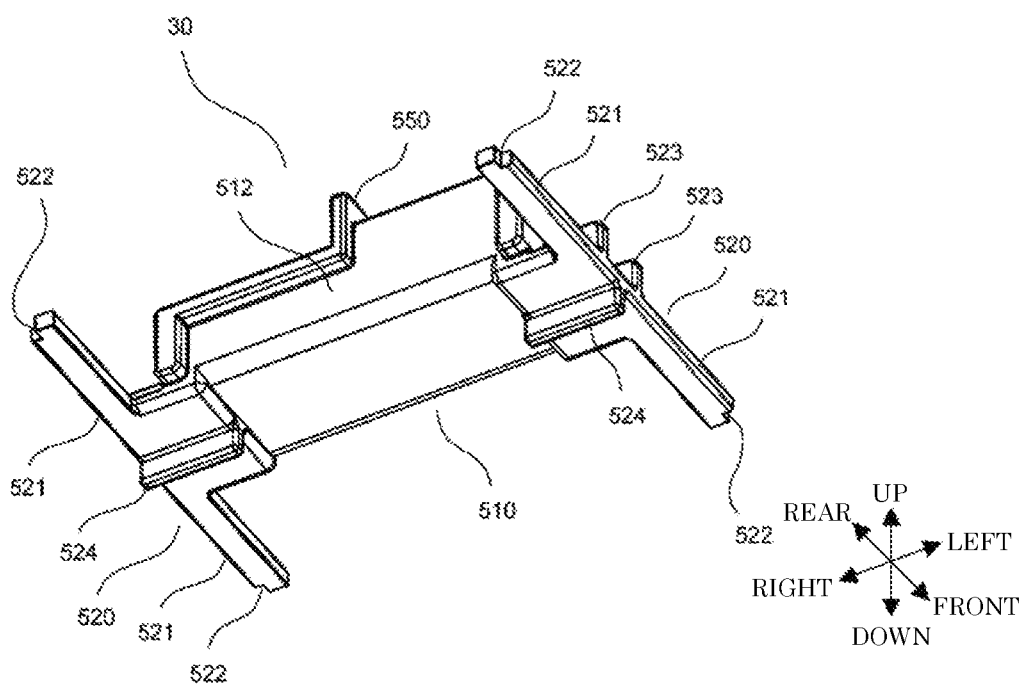
FIG. 5B is a lower rear perspective view illustrating the terminal mount according to the exemplary embodiment.
Figure 6A:
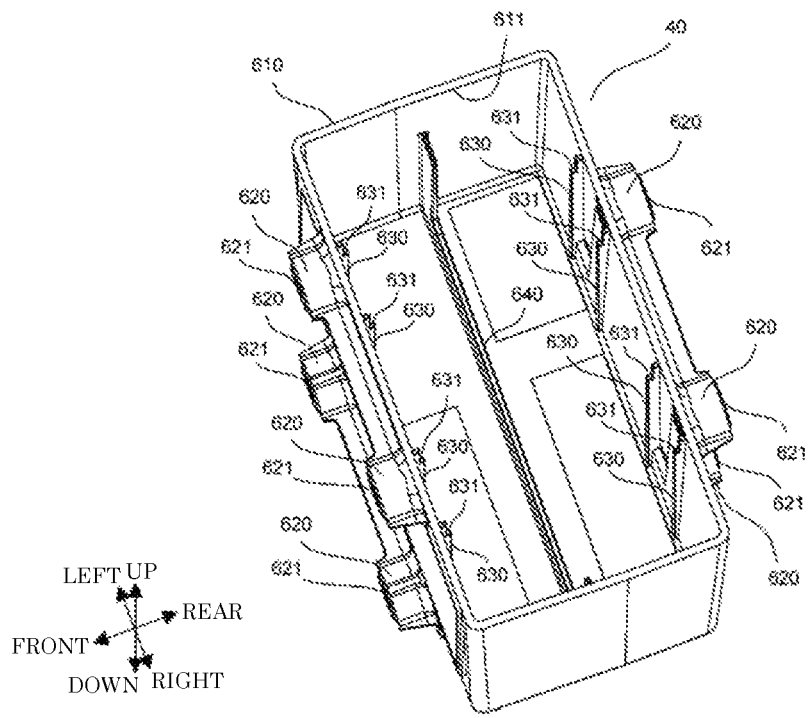
FIG. 6A is an upper front perspective view illustrating a case according to the exemplary embodiment.
Figure 6B:
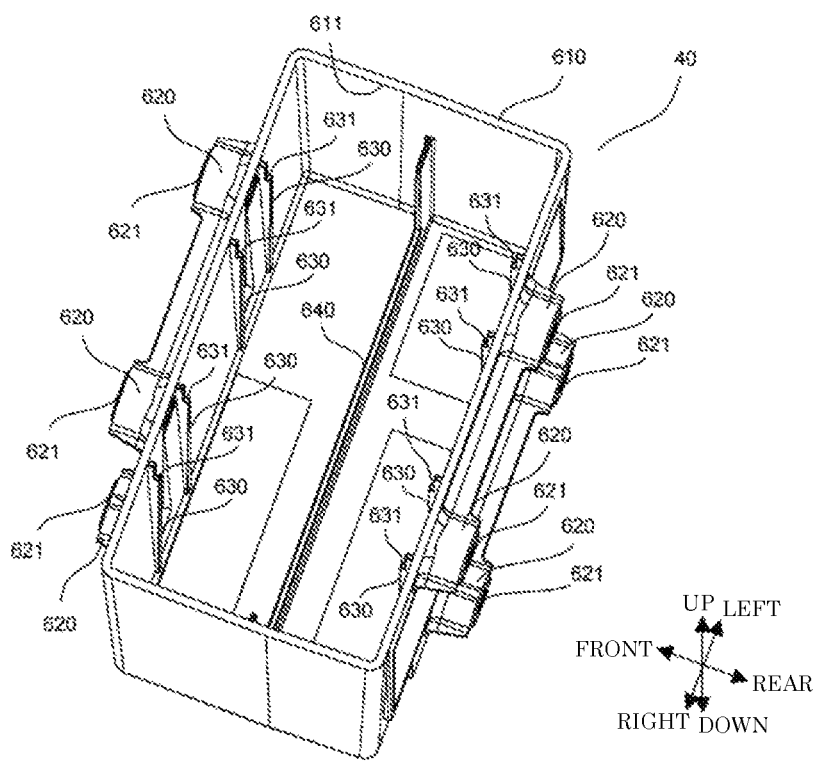
FIG. 6B is an upper rear perspective view illustrating the case according to the exemplary embodiment.

FIG. 1A is a perspective view illustrating film capacitor 1 according to the exemplary embodiment. FIG. 1B is a perspective view illustrating capacitor assembly AS made up of front capacitor element unit 10, rear capacitor element unit 20, and terminal mount 30 according to the exemplary embodiment. FIG. 2 is an exploded perspective view illustrating capacitor assembly AS according to the exemplary embodiment. FIG. 3 is an exploded perspective view illustrating front capacitor element unit 10 according to the exemplary embodiment. FIG. 4 is an exploded perspective view illustrating rear capacitor element unit 20 according to the exemplary embodiment. FIG. 5A is an upper front perspective view illustrating terminal mount 30 according to the exemplary embodiment and FIG. 5B is a lower rear perspective view illustrating terminal mount 30 according to the exemplary embodiment. FIG. 6A is an upper front perspective view illustrating case 40 according to the exemplary embodiment and FIG. 6B is an upper rear perspective view illustrating case 40 according to the exemplary embodiment.

With reference to FIGS. 1A, 1B, and 2, film capacitor 1 includes front capacitor element unit 10, rear capacitor element unit 20, terminal mount 30, case 40, and filler resin 50. Front capacitor element unit 10 and rear capacitor element unit 20 are aligned along the front-rear direction. Front capacitor element unit 10, rear capacitor element unit 20, and terminal mount 30 are integrated together to constitute capacitor assembly AS. Capacitor assembly AS is housed in case 40. Case 40 is filled with filler resin 50.

With reference to FIG. 3, front capacitor element unit 10 includes front capacitor element group 100A, first front bus bar 200A, and second front bus bar 300A.

Front capacitor element group 100A includes a plurality of capacitor elements 110 arranged in the up-down and the right-left directions. In the present exemplary embodiment, front capacitor element group 100A includes a total of six capacitor elements 110, i.e., three elements in each column along the up-down direction and two elements in each row along the right-left direction.

Capacitor element 110 is formed by stacking two metalized films in each of which aluminum is deposited on a dielectric film, winding or laminating the stacked metalized films, and pressing the wound or laminated metalized films into a flat shape. First end-face electrode 111 is formed on one end face of capacitor element 110 by spraying metal such as zinc, and similarly, second end-face electrode 112 is formed on the other end face of the capacitor element by spraying metal such as zinc.

Capacitor element 110 may be made of the metalized films in each of which metal such as zinc and magnesium other than aluminum is deposited on the dielectric film. Alternatively, capacitor element 110 may be made of the metalized films in each of which a plurality of metals among such metals are deposited on the dielectric film or be made of the metalized films in each of which an alloy of such metals is deposited on the dielectric film.

In front capacitor element group 100A, each of both end faces of each capacitor element 110 faces in the front-rear direction. Each of first end-face electrodes 111 is disposed at a front side of capacitor element 110, and each of second end-face electrodes 112 is disposed at a rear side of capacitor element 110.

First front bus bar 200A is made of a conductive material such as a copper plate. And first front bus bar 200A includes first electrode terminal 210, first coupling part 220, first overlapping part 230, and first connection terminal 240. First front bus bar 200A is formed by, for example, cutting out and bending one copper plate as appropriate, and thus first electrode terminal 210, first coupling part 220, first overlapping part 230, and first connection terminal 240 are integrated together.

First electrode terminal 210 has a substantially rectangular plate shape and covers first end-face electrodes 111 of capacitor elements 110. First electrode terminal 210 has twelve openings 211 that are formed side by side in the right-left and the up-down directions. Meanwhile, two among twelve openings 211 are notches. Two openings 211 are assigned to one capacitor element 110. Electrode pin 212 is disposed at an upper edge of each opening 211.

First coupling part 220 couples first electrode terminal 210 and first overlapping part 230. First coupling part 220 has a substantially slender rectangular plate shape, and extends rearward from an upper edge of first electrode terminal 210. At a center of first coupling part 220, passage hole 221 having an oval shape is formed to allow filler resin 50 to pass through.

First overlapping part 230 has a substantially slender rectangular plate shape and has about half a length of first coupling part 220. And first overlapping part 230 extends upward from a middle part of a rear edge of first coupling part 220.

First connection terminal 240 slightly extends upward from a right side part of an upper edge of first overlapping part 230, and is then bent rearward to extend rearward. A portion of first connection terminal 240 extending rearward constitutes connecting part 240a that is used to connect with an external terminal. Connecting part 240a has circular attachment hole 241 that penetrates connecting part 240a in a direction from a frontside to a backside of connecting part 240a.

Second front bus bar 300A is made of a conductive material such as a copper plate. And second front bus bar 300A includes second electrode terminal 310, second coupling part 320, second overlapping part 330, and second connection terminal 340. Second front bus bar 300A is formed by, for example, cutting out and bending one copper plate as appropriate, and thus second electrode terminal 310, second coupling part 320, second overlapping part 330, and second connection terminal 340 are integrated together.

Second electrode terminal 310 has a substantially rectangular plate shape and covers second end-face electrodes 112 of capacitor elements 110. Second electrode terminal 310 has twelve openings 311 that are formed side by side in the right-left and the up-down directions. Meanwhile, two among twelve openings 311 are notches. Two openings 311 are assigned to one capacitor element 110. Electrode pin 312 is disposed at an upper edge of each opening 311.

Second coupling part 320 couples second electrode terminal 310 and second overlapping part 330. Second coupling part 320 has a substantially slender rectangular plate shape, and extends frontward from an upper edge of second electrode terminal 310. At a center of second coupling part 320, passage hole 321 having an oval shape is formed to allow filler resin 50 to pass through.

Second overlapping part 330 has a substantially slender rectangular plate shape and has about half a length of second coupling part 320. And second overlapping part 330 extends upward from a middle part of a front edge of second coupling part 320.

Second connection terminal 340 extends upward from a left side part of an upper edge of second overlapping part 330, and is then bent frontward to extend rearward. A portion of second connection terminal 340 extending rearward constitutes connecting part 340a that is used to connect with an external terminal. Connecting part 340a has circular attachment hole 341 that penetrates connecting part 340a in a direction from a frontside to a backside of connecting part 340a.

Electrode pins 212 of first electrode terminal 210 are respectively joined to first end-face electrodes 111 on capacitor elements 110 by a joining method such as soldering, and thus first front bus bar 200A is electrically connected to first end-face electrodes 111. Electrode pins 312 of second electrode terminal 310 are joined to second end-face electrodes 112 on capacitor elements 110 by a joining method such as soldering, and thus second front bus bar 300A is electrically connected to second end-face electrodes 112. Front capacitor element group 100A, first front bus bar 200A, and second front bus bar 300A are combined together by a method such as soldering. Hence, front capacitor element unit 10 is built up (see FIG. 2).

While front capacitor element unit 10 is built up, first overlapping part 230 of first front bus bar 200A and second overlapping part 330 of second front bus bar 300A overlap each other in the front-rear direction. First overlapping part 230 and second overlapping part 330 overlaps each other. This contributes to a reduction in equivalent series inductance (ESL) of front capacitor element unit 10.

Insulating sheet 400 is disposed between first overlapping part 230 and second overlapping part 330. Insulating sheet 400 is made of an electrical insulating resin material, such as insulating paper, acrylic, or silicone. First overlapping part 230 and second overlapping part 330 are electrically insulated from each other by insulating sheet 400.

Rear capacitor element unit 20 has substantially similar configuration to front capacitor element unit 10. With reference to FIG. 4, rear capacitor element unit 20 includes rear capacitor element group 100B, first rear bus bar 200B, and second rear bus bar 300B. In rear capacitor element unit 20, second rear bus bar 300B is disposed in front of rear capacitor element group 100B, and first rear bus bar 200B is disposed behind rear capacitor element group 100B.

Rear capacitor element group 100B has similar configuration to front capacitor element group 100A. However, in rear capacitor element group 100B, in contrast to front capacitor element group 100A, second end-face electrodes 112 are located at a front side of rear capacitor element group 100B, and first end-face electrodes 111 are located at a rear side of rear capacitor element group 100B. First rear bus bar 200B has similar configuration to first front bus bar 200A except that a position of first connection terminal 240 with respect to first overlapping part 230 differs between first front bus bar 200A and first rear bus bar 200B. Second rear bus bar 300B has similar configuration to second front bus bar 300A except that a position of second connection terminal 340 with respect to second overlapping part 330 differs between second front bus bar 300A and second rear bus bar 300B.

With reference to FIGS. 5A and 5B, a configuration of terminal mount 30 will be described. Terminal mount 30 is made of a material having an electrical insulating property, for example, a resin material such as polyphenylene sulfide (PPS). The terminal mount includes mount body 510 and positioning parts 520 which are formed at right end and left end of mount body 510, respectively. Mount body 510 includes first mount part 530, second mount part 540, and partition 550.

First mount part 530 has a substantially rectangular parallelepiped shape. Thread hole 532 is formed in upper surface 530a of first mount part 530 by insert molding of metal nut 531. Second mount part 540 has a substantially rectangular parallelepiped shape, and is disposed next to and in contact with first mount part 530. Thread hole 542 is formed in upper surface 540a of second mount part 540 by insert molding of metal nut 541. Upper surface 540a of second mount part 540 is higher in level than upper surface 530a of first mount part 530. Upper surface 540a of second mount part 540 and upper surface 530a of first mount part 530 may be at an identical level. Partition 550 is disposed at a boundary between upper surface 530a of first mount part 530 and upper surface 540a of second mount part 540, and extends in the front-rear direction.

Each positioning part 520 includes two bar-shaped legs 521 each having a rectangular cross section. One of the two bar-shaped legs extends frontward and the other of the two bar-shaped legs extends rearward. Cutout 522 is formed at a distal end of each leg 521 and is disposed at an outermost corner of terminal mount 30. Positioning part 520 is provided with two reinforcing ribs 523 which are linked to an end face of mount body 510. A lower surface of positioning part 520 is provided with partition rib 524 which hangs down and extends in the right-left direction.

A front surface of mount body 510 has front recess 511 that is recessed so as to suit a shape of second overlapping part 330 and second connection terminal 340 of second front bus bar 300A. Similarly, a rear surface of mount body 510 has rear recess 512 that is recessed so as to suit a shape of second overlapping part 330 and second connection terminal 340 of second rear bus bar 300B.

Front capacitor element unit 10 is attached to terminal mount 30 from the front. After front capacitor element unit 10 is attached, rear capacitor element unit 20 is attached to terminal mount 30 from the rear. As a result, front capacitor element unit 10, rear capacitor element unit 20, and terminal mount 30 are integrated as capacitor assembly AS (see FIGS. 1B and 2).

Connecting part 240a of first connection terminal 240 of first front bus bar 200A and connecting part 240a of first connection terminal 240 of first rear bus bar 200B overlap over upper surface 530a of first mount part 530 in this order. Attachment hole 241 in first connection terminal 240 of first front bus bar 200A and attachment hole 241 in first connection terminal 240 of first rear bus bar 200B are matched with thread hole 532 in first mount part 530. Similarly, second connection terminal 340 of second front bus bar 300A and second connection terminal 340 of second rear bus bar 300B overlap over upper surface 540a of second mount part 540 in this order. Attachment hole 341 in second connection terminal 340 of second front bus bar 300A and attachment hole 341 in second connection terminal 340 of second rear bus bar 300B are matched with thread hole 542 in second mount part 540.

Second overlapping part 330 and a part of second connection terminal 340 of second front bus bar 300A are fit into front recess 511. This restricts movement of front capacitor element unit 10 with respect to terminal mount 30 in the up-down direction, the right-left direction, and rearward. Similarly, second overlapping part 330 and a part of second connection terminal 340 of second rear bus bar 300B are fit into rear recess 512. This restricts movement of rear capacitor element unit 20 with respect to terminal mount 30 in the up-down direction, the right-left direction, and frontward.

Partition 550 is disposed between two first connection terminals 240 and two second connection terminals 340. Two partition ribs 524 are sandwiched between front capacitor element unit 10 and rear capacitor element unit 20.

With reference to FIGS. 1A, 6A, and 6B, a configuration of case 40 will be described. Case 40 is made of a resin, for example, polyphenylene sulfide (PPS), a thermoplastic resin. Case 40 includes case body 610 that has a substantially rectangular parallelepiped box shape and an open upper face. A width of case body 610 in the right-left direction is greater than a width of case body 610 in the front-rear direction. For instance, the width in the right-left direction may be approximately twice or greater than the width in the front-rear direction.

Front outer wall surface and rear outer wall surface of case body 610 each have four attachment bosses 620. Each of four attachment bosses 620 has a substantially cylindrical shape. Metal nut 621 is embedded into each attachment boss 620 by insert molding. Attachment bosses 620 are used to attach film capacitor 1 to an external device or other equipment.

Front inner wall surface and rear inner wall surface of case body 610 each have four ribs 630. Each of four ribs 630 extends in the up-down direction. An upper end of each rib 630 has step portion 631 that is formed by cutting out an inner corner of the rib. At a middle of case body 610 in the front-rear direction, partition wall 640 is disposed so as to extend from a bottom surface to midway points of right inner wall surface and left inner wall surface of the case body.

Figure 7:
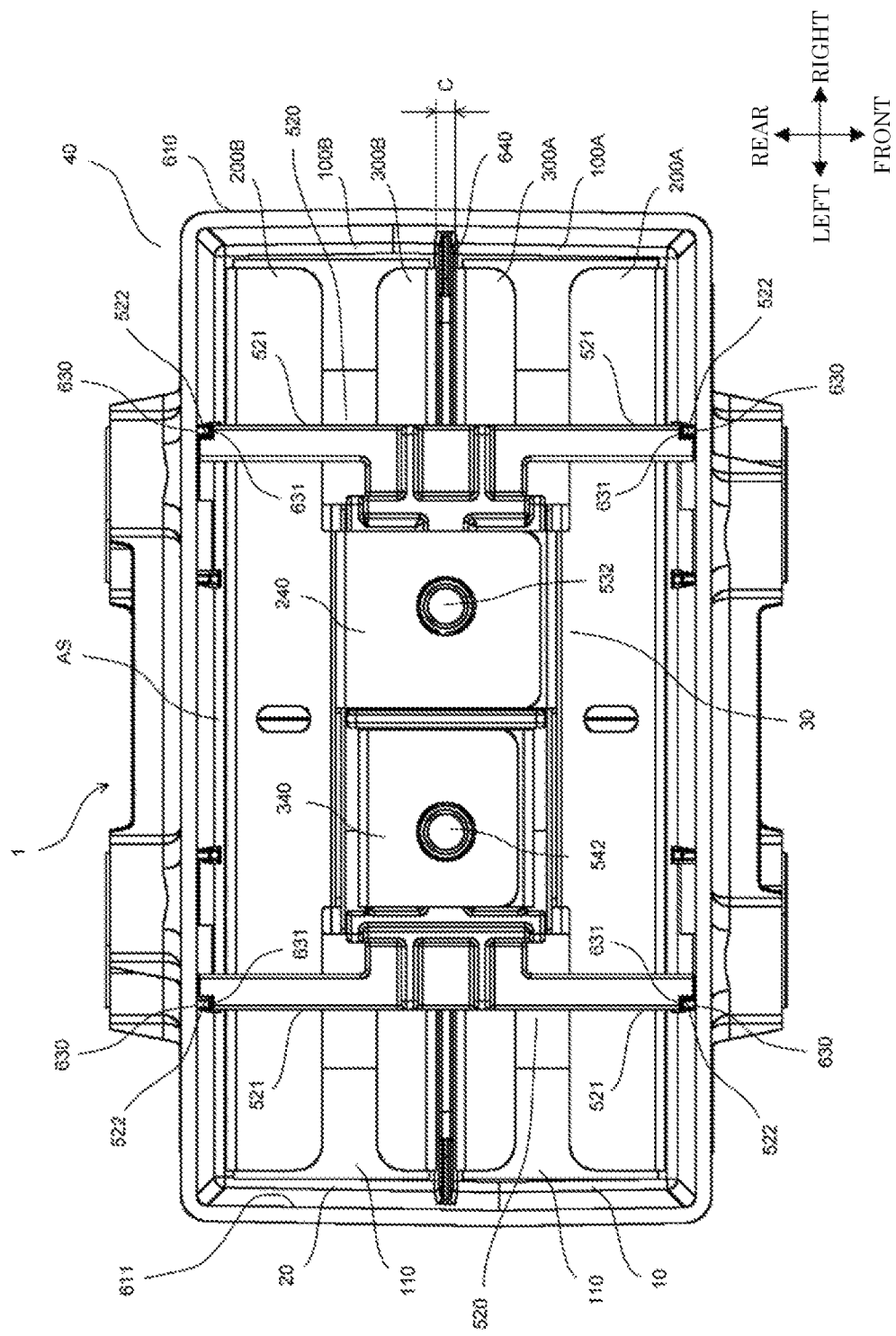
FIG. 7 is a top view illustrating the film capacitor in which the capacitor assembly is housed in the case according to the exemplary embodiment before the case is filled with a filler resin.

FIG. 7 is a top view illustrating film capacitor 1 in which capacitor assembly AS is housed in case 40 according to the present exemplary embodiment before case 40 is filled with filler resin 50.

Capacitor assembly AS is housed into case 40 through opening 611 in an upper surface of case 40. In case 40, terminal mount 30 is located closer to opening 611 than front capacitor element group 100A and rear capacitor element group 100B are. Positioning parts 520 at both ends of terminal mount 30 engage with case 40 such that terminal mount 30 is positioned with respect to case 40 in the front-rear direction, the right-left direction, and the up-down direction. In the present exemplary embodiment, the front-rear direction and the right-left direction are parallel to an opening face of opening 611 and orthogonal to each other. The up-down direction is perpendicular to the opening face of opening 611.

Specifically, front leg 521 of positioning part 520 is elongated to the front inner wall surface, and a distal end of front leg 521 is put into contact with the front inner wall surface. Meanwhile, rear leg 521 of positioning parts 520 is elongated to the rear inner wall surface, and a distal end of rear leg 521 is put into contact with the rear inner wall surface. Hence, positioning part 520 sticks to support between the front wall surface and rear inner wall surface, and terminal mount 30 is positioned with respect to case 40 in the front-rear direction.

Cutouts 522 in front leg 521 of right positioning part 520 engages with step portion 631 of right-end front rib 630 of case 40. Meanwhile, cutouts 522 in rear leg 521 of right positioning part 520 engages with step portion 631 of right-end rear rib 630 of case 40. Further, cutouts 522 in front leg 521 of left positioning part 520 engages with step portion 631 of left-end front rib 630 of case 40. Meanwhile, cutouts 522 in rear leg 521 of left positioning part 520 engages with step portion 631 of left-end rear rib 630 of case 40. Hence, right positioning part 520 restricts movement of terminal mount 30 in the right direction and the down direction, and left positioning part 520 restricts movement of terminal mount 30 in the left direction and the down direction. As a result, terminal mount 30 is positioned with respect to case 40 in the right-left direction and the up-down direction.

At a bottom of case 40, partition wall 640 is sandwiched between front capacitor element unit 10 and rear capacitor element unit 20.

In order to prevent front capacitor element unit 10 and rear capacitor element unit 20 from being detached from terminal mount 30 frontward and rearward respectively when capacitor assembly AS is housed into case 40, two first connection terminals 240 and two second connection terminals 34 are temporarily fixed to terminal mount 30 with screws (not shown). In this case, after film capacitor 1 is completed by curing filler resin 50 filling case 40, the screws are removed.

Case 40, which houses capacitor assembly AS, is filled with filler resin 50 flowing through opening 611 (see FIG. 1A). Filler resin 50 made of a thermosetting resin such as an epoxy resin is injected into case 40 in a molten state. In case 40, filler resin 50 is loaded to a level that is slightly above legs 521 of positioning parts 520 of terminal mount 30. In this state, partition ribs 524 of terminal mount 30 and partition wall 640 of case 40 provide clearance C between front capacitor element unit 10 and rear capacitor element unit 20 (see FIG. 7). This allows filler resin 50 to be satisfactorily distributed between front capacitor element unit 10 and rear capacitor element unit 20.

By heating case 40, filler resin 50 is cured inside case 40. During this process, because of contraction of filler resin 50, force is inwardly applied to case 40 with which filler resin 50 is in tight contact. Since a width of case 40 in the right-left direction is greater than a width of case 40 in the front-rear direction, case 40 is apt to be deformed such that the front surface and the rear surface warp inward. Nevertheless, since two positioning parts 520 of terminal mount 30 stick to support between the front inner wall surface and rear inner wall surface of case 40, deformation of case 40 in the front-rear direction due to the contraction of filler resin 50 is suppressed.

When case 40 has been completely filled with filler resin 50 in this way, film capacitor 1 is completed. Inside case 40, front capacitor element group 100A and rear capacitor element group 100B are covered with filler resin 50 and are protected from moisture and impact. Filler resin 50 is loaded to a level above legs 521 of positioning parts 520, and legs 521 are embedded into filler resin 50. This hinders terminal mount 30 from moving upward.

Film capacitor 1 is designed to be installed on an external device or other equipment. A first external terminal (not shown) included in an external device or other equipment is connected to first connection terminals 240 of first front bus bar 200A and first rear bus bar 200B. A second external terminal (not shown) included in the external device or other equipment is connected to second connection terminals 340 of second front bus bar 300A and second rear bus bar 300B. The first external terminal and two first connection terminals 240 are fixed to first mount part 530 of terminal mount 30 with a screw (not shown) to facilitate and strengthen the connection of the external terminal to two first connection terminals 240. Similarly, the second external terminal and two second connection terminals 340 are fixed to second mount part 540 of terminal mount 30 with a screw (not shown) to facilitate and strengthen the connection of the external terminal to two second connection terminals 340.

Effects of Exemplary Embodiment

As described above, the present exemplary embodiment exerts the following effects.

Positioning parts 520 included in terminal mount 30 enable terminal mount 30 to be positioned with respect to case 40 in the front-rear direction, the right-left direction, and the up-down direction, i.e., three-axis directions (XYZ axes directions). This configuration readily offers an improvement in accuracy with which the position of terminal mount 30 with respect to case 40 is determined in the three-axis directions.

Improved accuracy with which the position of terminal mount 30 with respect to case 40 is determined contributes to an improvement in accuracy with which the position of each of front capacitor element unit 10 and rear capacitor element unit 20, which are attached to terminal mount 30, with respect to case 40 is determined.

Two positioning parts 520 of terminal mount 30 stick to support between the front inner wall surface and rear inner wall surface of case 40. This configuration prevents the front surface and the rear surface of case 40 from being deformed due to the contraction of filler resin 50. Here, each of the front surface and the rear surface of case 40 is wider than the right surface or the left surface. Since deformation of case 40 is prevented in this way, a material having a contraction percentage higher than that of conventional materials can be adopted for filler resin 50. This increases flexibility in selecting a material for filler resin 50.

In particular, since positioning parts 520 are formed at both ends of terminal mount 30, two positioning parts 520 are able to prevent the deformation of case 40 satisfactorily.

The movement of terminal mount 30 with respect to case 40 is restricted in the front-rear direction and the right-left direction because of engagement of positioning parts 520 with case 40. As a result, when first connection terminals 240 and the external terminal as well as second connection terminals 340 and the external terminal are fixed to terminal mount 30 with screws, force for tightening the screws is less likely to turn terminal mount 30. The movement of terminal mount 30 with respect to case 40 is restricted in the downward direction because of engagement of positioning parts 520 with case 40. As a result, when first connection terminals 240 and the external terminal as well as second connection terminals 340 and the external terminal are fixed to terminal mount 30 with screws, force for pressing terminal mount 30 is less likely to move terminal mount 30 downward.

Terminal mount 30 is made by integrating first mount part 530 with second mount part 540. Here, first mount part 530 is a terminal mount for first connection terminals 240, and second mount part 540 is a terminal mount for second connection terminals 340. This configuration enables to constitute capacitor assembly AS more firmly as compared with a configuration in which first mount part 530 and second mount part 540 are separately constituted as a terminal mount. First mount part 530 and second mount part 540 are integrated together such that these mount parts are disposed next to and in contact with each other. In other words, first mount part 530 and second mount part 540 are not connected via a coupling member with a gap left between these mount parts. Hence, terminal mount 30 itself can be configured firmly. Moreover, partition 550 is disposed between first mount part 530 and second mount part 540. Even though first mount part 530 and second mount part 540 are in contact with each other, partition 550 provides a satisfactory creepage distance between first connection terminal 240 and second connection terminal 340, and ensures satisfactory electrical insulation.

Although the exemplary embodiment of the present disclosure has been described above, the present disclosure is not limited to the exemplary embodiment described above, and application examples of the present disclosure can include various modifications in addition to the above exemplary embodiment.

Figure 8A:
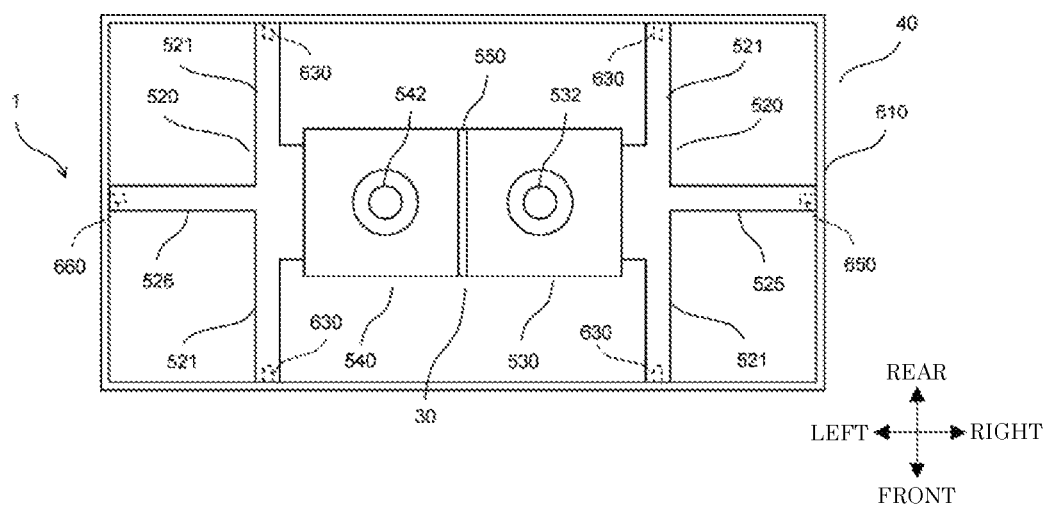
FIG. 8A is a top view illustrating a film capacitor that is not filled with a filler resin according to a modified example.

In the exemplary embodiment described above, positioning part 520 of terminal mount 30, for example, include leg 521 being elongated between the front inner wall surface and rear inner wall surface of case 40 to prevent the front surface and the rear surface of the case from being deformed. Here, each of the front surface and the rear surface of case 40 is wider than the right surface or the left surface. If there is a risk of the occurrence of a disadvantageous deformation in the right surface and the left surface of case 40, terminal mount 30 may be configured as shown in FIG. 8A such that right positioning part 520 includes leg 525 extending to and coming into contact with the right surface and that left positioning part 520 includes leg 526 extending to and coming into contact with the left surface. In this instance, case 40 is provided with rib 650 and rib 660 which are corresponding to respective leg 525 and leg 526. In an instance of such a configuration, legs 521, leg 525, and leg 526 are placed on upper ends of respective ribs 630, rib 650, and rib 660, no cutout is formed in each of legs 521, leg 525, and leg 526, and no step portions are formed in ribs 630, rib 650, and rib 660.

Figure 8B:
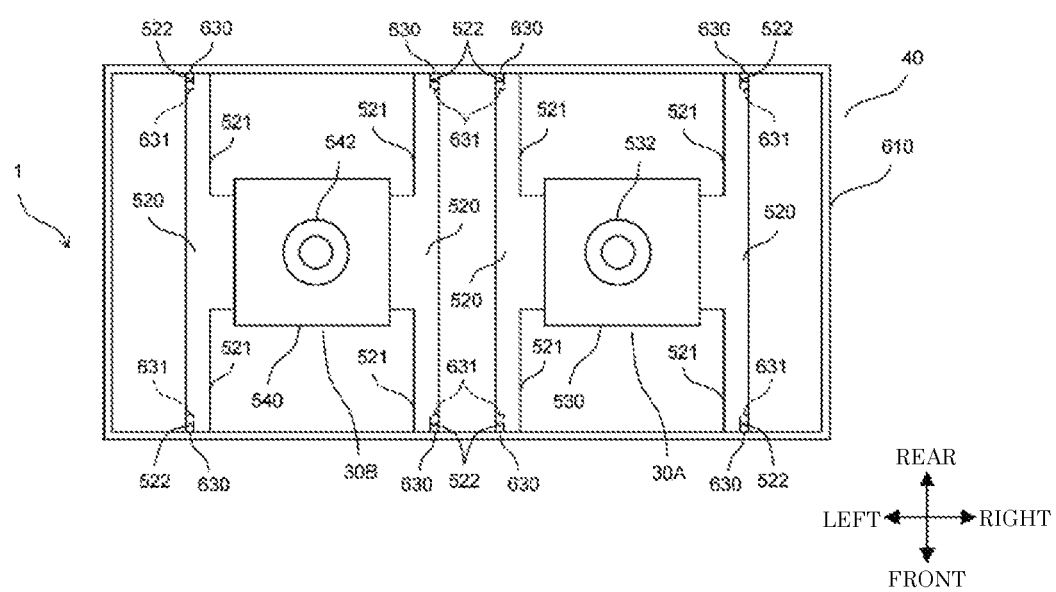
FIG. 8B is a top view illustrating a film capacitor that is not filled with a filler resin according to another modified example.

In the exemplary embodiment described above, terminal mount 30 is made by integrating first mount part 530 with second mount part 540. Alternatively, as shown in FIG. 8B, terminal mount 30A constituted only by first mount part 530 and terminal mount 30B constituted only by second mount part 540 may be arranged in the right-left direction inside case 40. In this configuration, positioning parts 520 are formed at both ends of each of terminal mount 30A and terminal mount 30B, and ribs 630 are formed on case 40. In this situation, positioning parts 520 and ribs 630 position terminal mount 30A and terminal mount 30B with respect to case 40 in the front-rear direction, the right-left direction, and the up-down direction.

In FIGS. 8A and 8B, illustration of front capacitor element unit 10 and rear capacitor element unit 20 is omitted for explanatory convenience.

In the exemplary embodiment described above, positioning parts 520 are configured to engage with case 40 such that terminal mount 30 is positioned with respect to case 40 in the three-axis directions, i.e., all of the front-rear direction, the right-left direction, and the up-down direction. Alternatively, terminal mount 30 may not necessarily be positioned with respect to case 40 in all the three-axis directions. Positioning parts 520 may be configured to engage with case 40 such that terminal mount 30 is positioned with respect to case 40 in at least one of the front-rear direction and the right-left direction.

In the exemplary embodiment described above, film capacitor 1 includes two capacitor element units, i.e., front capacitor element unit 10 and rear capacitor element unit 20. Alternatively, film capacitor 1 may include one capacitor element unit.

In the exemplary embodiment described above, front capacitor element unit 10 and rear capacitor element unit 20 each have one first connection terminal 240 and one second connection terminal 340. Alternatively, the capacitor element units may each have a plurality of first connection terminals 240 and a plurality of second connection terminals 340. In this case, the film capacitor includes a plurality of terminal mounts 30.

Front and rear capacitor element groups 100A and 100B may each be constituted by any number of capacitor elements 110. The number of capacitor elements 110 may be one rather than a plurality of capacitor elements that constitute each of front capacitor element group 100A and rear capacitor element group 100B.

In the exemplary embodiment described above, capacitor element 110 is formed by stacking two metalized films in each of which aluminum is deposited on the dielectric film, and winding or laminating the stacked metalized films. Alternatively, capacitor element 110 may be formed by stacking an insulating film and a metalized film that includes a dielectric film and aluminum deposited on both sides of the dielectric film, and winding or laminating the stacked insulating film and the metalized film.

In the exemplary embodiment described above, film capacitor 1 is used as an example of a capacitor of the present disclosure. Alternatively, the present disclosure may be applied to capacitors other than film capacitor 1.

In addition, various modifications can be appropriately made to the exemplary embodiment of the present disclosure within the scope of the technical idea disclosed in the claims.

It should be noted that, in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present disclosure is useful for capacitors for use in various types of electronic devices, electrical devices, industrial equipment, electric components for vehicles, and the like.

What is claimed is:

1. A capacitor comprising:
a capacitor element including an electrode;
a bus bar that includes an electrode terminal and a connection terminal, the electrode terminal being connected to the electrode of the capacitor element, the connection terminal being configured to be connected to an external terminal;
a case that has an opening and houses the capacitor element connected to the bus bar; and
a terminal mount disposed closer to the opening of the case than the capacitor element is, the terminal mount being configured to allow the external terminal and the connection terminal to be fixed to the terminal mount, wherein:
the terminal mount includes a first positioning part and a second positioning part, the first positioning part and the second positioning part each positioning the terminal mount with respect to the case in a first direction parallel to an opening face of the opening,
the case has a width greater in a second direction than that in the first direction, the second direction being parallel to the opening face of the opening and orthogonal to the first direction,
the first positioning part includes a first beam shaped part that extends to an inner wall surface of the case and is in contact with the inner wall surface,
the second positioning part includes a second beam shaped part that extends to an inner wall surface of the case and is in contact with the inner wall surface,
the inner wall surface of the case has a first rib and a second rib, the first rib and the second rib each extending in a third direction perpendicular to the opening face of the opening,
the first rib and the second rib are arranged along the second direction, and
a side face in a distal end of the first beam shaped part is in contact with only a first face of the first rib and a side face in a distal end of the second beam shaped part is in contact with only a second face of the second rib so that a displacement of the terminal mount in the second direction is restricted, the side face being perpendicular to the second direction, the first face of the first rib facing the second face of the second rib.

2. The capacitor according to claim 1, wherein each of the first beam shaped part and the second beam shaped part is elongated between two inner wall surfaces of the case opposite to each other in the first direction and is put into contact with the two inner wall surfaces, the two inner wall surfaces include the inner wall surface of the case.

3. The capacitor according to claim 1, wherein the first positioning part is provided at one of both ends of the terminal mount and the second positioning part is provided at another of the both ends of the terminal mount, the one of the both ends of the terminal mount being opposite to the another of the both ends of the terminal mount in the second direction.

4. The capacitor according to claim 1, wherein:
each of the first rib and the second rib has a step portion,
the distal end of each of the first beam shaped part and the second beam shaped part has a cutout, and
the cutout engages with the step portion to restrict a displacement of the terminal mount in the third direction.

5. The capacitor according to claim 1, wherein:
the electrode includes at least one of a first end-face electrode and a second end-face electrode, the first end-face electrode and the second end-face electrode being disposed on both end faces of the capacitor element, respectively,
the bus bar includes at least one of a first bus bar connected to the first end-face electrode and a second bus bar connected to the second end-face electrode,
the terminal mount includes a material having an electrical insulating property, and includes a first mount part and a second mount part that is disposed next to and in contact with the first mount part, the connection terminal of the first bus bar being fixed to the first mount part, the connection terminal of the second bus bar being fixed to the second mount part, and
the terminal mount includes a partition that is disposed between the connection terminal of the first bus bar and the connection terminal of the second bus bar.

* * * * *